Nov. 5, 1968 R. M. GOODERHAM 3,409,065
TRACTION DEVICE
Filed Jan. 24, 1966

INVENTOR.
RICHARD M. GOODERHAM
BY
Douglas S. Johnson
Attorney

United States Patent Office 3,409,065
Patented Nov. 5, 1968

3,409,065
TRACTION DEVICE
Richard M. Gooderham, 34 Rosedale Heights Drive,
Toronto, Ontario, Canada
Filed Jan. 24, 1966, Ser. No. 522,475
4 Claims. (Cl. 152—218)

ABSTRACT OF THE DISCLOSURE

A traction assembly formed of opposed arms, each shaped to fit over a tire with the arms connected across the tire by telescoping channels. The inner telescopic channel has a pivotal plate biased to frictionally engage the outer channel; the telescopic movement outward of the channels is prevented because the frictional binding action is accentuated whereas the inward movement reduces the frictional engagement. Hence, when the arms are secured on the tire the only telescopic movement possible is inward which serves to tighten the assembly.

This invention relates to traction devices for vehicle wheels which are readily fixed to facilitate driving the vehicle out of the snow and the like; more particularly, the invention relates to a traction device which may be applied to the tire of the driven wheels on automotive vehicles.

In applicant's co-pending Canadian application SN 920,551 a traction device was proposed which included a pair of spaced apart traction elements, each having spaced or hooked portions generally conforming to and adapted to extend across the tread portion of a tire to which the traction device is applied; springs connected the spaced apart elements and each of the latter was provided with an abutment bearing with frictional contact onto a plate which was secured to the wheel by snap fitting resilient members. While this arrangement gave excellent traction it was necessary to provide different size plate members for different wheel sizes; also it was advisable to incorporate chain safety members which would limit the outward movement of the spring connected spaced apart traction elements.

The present invention eliminates the need for having various sizes of plates and also the chain safety members in the embodiment described above.

It is a feature of the invention that a locking device is provided to fix the traction elements in position and, that after initial installation, rotation of the wheel with resultant pressure on the traction elements causes inward movement thereof to reduce pounding, which movement is permitted by the locking device to further ensure retention of the traction elements.

The invention will now be described with reference to the accompanying drawings, in which.

Figure 1:
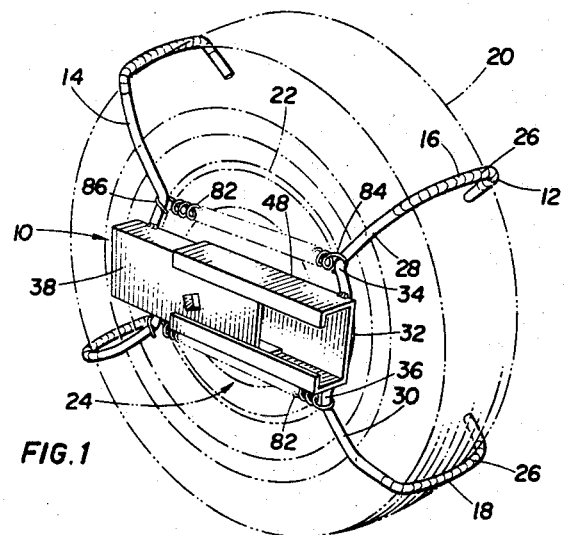
FIGURE 1 is a perspective view of a preferred embodiment of a traction device according to the invention applied to a pneumatic tired vehicle wheel.

With reference to the accompanying drawings a traction device, generally denoted by the numeral 10, comprises a pair of opposed similarly constructed traction elements 12 and 14 preferably formed from structural steel rod for cheapness. Due to the similar construction only one traction element, viz 12, will be described and it is provided at each end with traction shoes 16 and 18 shaped to conform with the periphery of a tire 20 carried on a rim 22 which is secured in the usual manner to a drum 24. The traction shoes 16 and 18 are provided with serrations 26 in order to provide a better grip on the surface.

Extensions 28 and 30 to the adjacent end of the shoes 16 and 18 converge towards the rim 22 on its outer side and the extensions 28 and 30 terminate at their inner ends in the vicinity of the rim 22 in an arcuate portion 32 which, as illustrated in FIGURE 1, generally conforms to the contour of the rim 22. It will be observed that the junction of the extensions 28 and 30 with the arcuate portion 32 provide respectively spaced apart elbows 34 and 36.

Extending inwards from the arcuate portion 32 of the traction element 12 is a channel member 38 having a base 40 and opposed walls 42 and 44. A longitudinal slot 46 is provided in the wall 42.

The channel member 38 is slidable within another member 48 secured at one end to the arcuate portion 32 of the other traction element 14. The member 48 has a base 50 and side walls 52 and 54 ending in inturned portions 56 and 58 which are substantially parallel to the base 50. It will be clear that the inturned portions 56 and 58 engage with the edges of the opposed side walls 42 and 44 whereby only lateral movement of the channel members 38 and 48 can take place with respect to each other.

Positioned in the channel member 38 and secured by a pivot 60 to the base 40 is a plate 62. The pivot 60 is positioned close to the end of a tapered portion 64 of the plate 62 which tapered portion 64 terminates just short of the side wall 44. One edge 66 of the tapered portion 64 is inclined away from the end of the channel 38 removed from the traction element 12, the edge 66 being directed towards the slot 46. The other edge 68 of the tapered portion 64 is similarly inclined and then runs into an edge 70 which is substantially parallel with the side wall 44. The edge 70 then merges into a substantially arcuate portion 72 which, in turn, merges into an edge 66 to form a portion 74; the portion 74 is dimensioned so that it is movable in the slot 46. A resilient member 76, preferably made of rubber, is secured to the base 40 or side wall 44 of the channel member 38; the rubber member 76 bears against the edge 70 of the plate 62 to urge the portion 74 of the latter through the slot 46.

Figure 2:
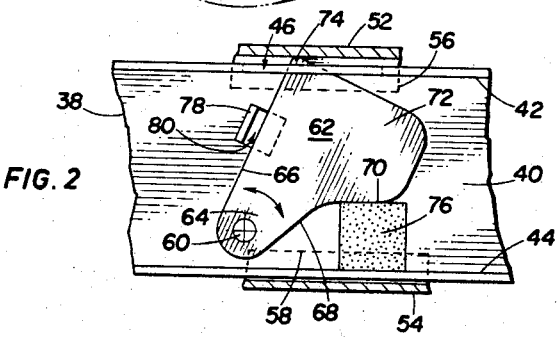
FIGURE 2 is a plan view of the locking device.
Figure 3:
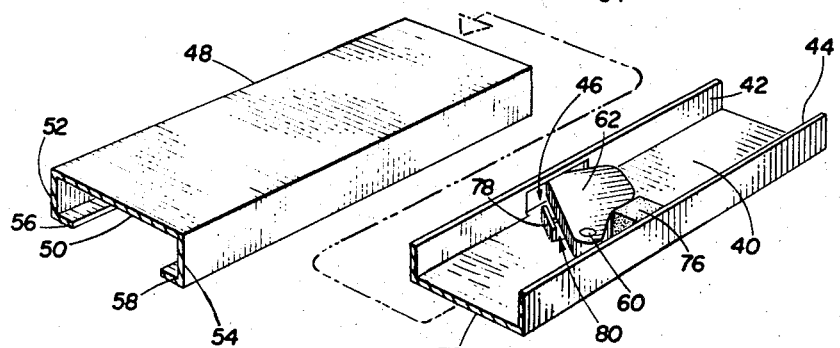
FIGURE 3 is an exploded perspective view of the locking device and accompanying sliding members.

The portion 74 of the plate 62 projecting through the slot 46 frictionally engages the inside of the wall 52 of the channel member 48. The position of the pivot 60 on the base 40 is such that with respect to FIGURE 2 the clockwise rotation of the plate 62 would cause the edge 66 to move arcuately and outwardly of the channel member 48 thus increasing the binding action. On the other hand, counter clockwise movement of the plate 62 will cause the portion 74 to move inwardly and arcuately away from the wall 52 of the channel member 48. Hence, inward telescoping movement of the channels 38 and 48 would not be impeded because the pressure of the channel member on the portion 74 could only urge the plate 62 in an anticlockwise direction. On the other hand outward telescoping movement of the channels 38 and 48 would be prevented because the frictional engagement of the portion 74 and the wall 52 of the channel member 48 would urge clockwise rotation of the plate 62 but this, in turn, would increase the binding action between the portion 74 and the wall 52 of the channel member 48; as a result there can be no outward telescopic movement.

An abutment 78 extends upward from the base 40 of the channel 38 and has a recess 80.

In the preferred embodiment and for the purpose of assembly the traction elements 12 and 14 are resiliently connected by means of a pair of springs 82. For the purpose of easy assembly one end of each of the springs 82 is provided with a loop 84 which permits it to be slipped over the traction element 12 to be eventually located in one of the elbows 34 or 46; the other end of the respective spring 82 is provided with a hook 86 to enable the spring 82 to be hooked onto the opposed traction element 14 in the region of the corresponding elbow 34 or 36 with the result that the springs 82 are located in a spaced apart substantially parallel relationship.

In use a traction device of the present invention may be readily attached to and adapted from a tire 20. The loop 84 of each of the springs 82 is placed over one of the traction elements 12 so that the pair of springs 82 are located respectively in the elbows 34 and 36. The shoes 16 and 18 are then fitted over the tire 20 and the other spring element 14 is similarly placed over the tire 20 on the opposite sides. The springs 82 are then stretched to enable the hooks 86 to be secured to the traction element 14 in the respective elbows 34 and 36. At the same time the channel member 38 is inserted into the other member 48 and movement inward is unimpeded because the pivotal rotation of the plate 62 is in the same direction as the member 48. However, when the shoes 16 and 18 are firmly secured to the tire 20 no release can occur during use because any tendency of outward movement of the member 48 causes the portion 74 of the plate 62 to jamb against the side wall 52. On the other hand, any untoward pressure on the traction elements 12 and 14 will be taken up by inward movement of the channels 38 and 48 thus reducing the pounding action of the traction elements on the tire. To release the assembly all that is necessary is to insert the end of a tool such as a screwdriver into the recess 80 of the abutment 78 and exert sufficient pressure against the resilient member 76.

While certain embodiments have been illustrated and described for the purpose of disclosure, it will be understood that this invention is not limited thereto but contemplates such modifications and other embodiments as may be utilised without departing from the invention.

I claim:
1. A traction assembly for a vehicle wheel mounted tire including two opposed elongated traction elements, each element having at each end a shoe overlying and conformably shaped to the peripheral portion of the tire supported by the rim of said wheel, said shoes located at four spaced points about the tire, a first channel member secured to one of said traction elements extending inwards with respect to said wheel rim, a separate channel member secured to said other element also extending inwards with respect to said wheel rim and in telescopic sliding relation with said first channel member, pivotal means on said first channel member, and means urging said pivotal means into frictional engagement with said separate channel member to prevent outward sliding movement of said channel members with respect to said wheel rim, each traction element and channel member being moved radially inwardly as the tire is compressed on meeting the ground so that the traction device will automatically be tightened on the wheel.

2. A traction assembly according to claim 1 wherein said member is a first channel and said separate member is a second channel having overlying walls to contain said first channel.

3. A traction assembly according to claim 2 having a slot in one of the side walls of said first channel and said pivotal means is a plate in said first channel pivoted at a point removed from said slot, the portion of said plate removed from said pivot being movable in said slot and bearing against the wall of said second channel adjacent said slot.

4. A traction assembly according to claim 2 wherein each of said traction elements has a pair of spaced apart elbows, the re-entrant angle of each elbow facing towards said wheel rim and a pair of spaced apart spring members with their respective ends connected to said traction elements at said spaced apart elbows.

References Cited
UNITED STATES PATENTS

| | | | |
|---|---|---|---|
| 3,073,370 | 1/1963 | Frank | 152—228 |
| 1,447,519 | 3/1923 | Schade | 287—126 X |
| 2,787,485 | 4/1957 | Frisell | 287—58 |
| 3,198,233 | 8/1965 | Aler | 152—218 |
| 3,283,796 | 11/1966 | White et al. | 152—218 |

ARTHUR L. LA POINT, *Primary Examiner.*

C. B. LYON, *Assistant Examiner.*